April 26, 1927.

J. W. NEASHAM 1,626,093

RINER ATTACHMENT FOR MEAT SLICING MACHINES

Filed Feb. 25, 1924     2 Sheets-Sheet 1

Inventor
John W. Neasham
by Oning & Hague Attys.

April 26, 1927.  1,626,093
J. W. NEASHAM
RINER ATTACHMENT FOR MEAT SLICING MACHINES
Filed Feb. 25, 1924    2 Sheets-Sheet 2

Inventor
John H. Neasham
by Ewing & Hague, Attys.

Patented Apr. 26, 1927.

1,626,093

UNITED STATES PATENT OFFICE.

JOHN W. NEASHAM, OF DES MOINES, IOWA.

RINER ATTACHMENT FOR MEAT-SLICING MACHINES.

Application filed February 25, 1924. Serial No. 695,081.

The object of my invention is to provide a device in the nature of an attachment which may be attached to the ordinary meat slicing machines, for the purpose of automatically removing the rine from the meat as it is being sliced.

A further object is to provide in a meat riner of that class which removes the rine at the time the meat is being sliced, improved means whereby the rine cutter will automatically remove a rine of uniform thickness.

A further object is to provide a riner for meat cutters in the nature of an attachment which may be easily and quickly applied without materially altering the meat cutting machine already on the market.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
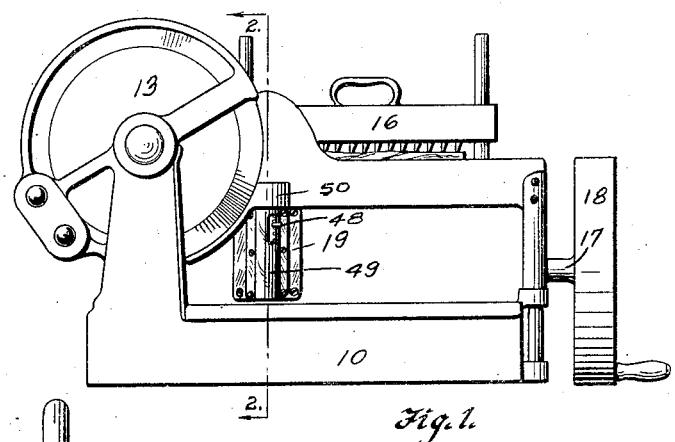
Figure 1 is a side elevation of a meat slicing machine which is particularly adapted to use my improved riner, the riner being shown attached thereto.

The numeral 10 indicates the frame member of a meat slicing machine of the type in common use. The frame 10 is provided with a carriage 11. A second carriage 12 is mounted on the said carriage 11 and designed to travel in transverse relation with the movement of the first said carriage. The carriage 11 is designed to move longitudinally with the face of a rotary cutter blade 13, while the carriage 12 is designed to move transversely with the movement of the first said carriage. A chunk of meat 14, such as bacon or the like, is placed on the carriage 12 with the rine 15 underneath and resting on the said carriage. A clamping device 16 is provided which travels with the carriage 12. Movement is imparted to the carriage 11, causing it to move past the cutter blade and meat in thin slices to be severed therefrom, after which the carriage returns to its starting position and the carriage 11 is operated to feed the meat into the path of the cutter.

The mechanism for operating the various carriages is not illustrated, due to the fact that this forms no part of my present invention. I have, however, illustrated a shaft 17 which is the main drive shaft and is provided with a crank wheel 18.

Adjacent to one side of the frame 10 I have provided a plate 19 which rests substantially beneath and in front of the cutter blade 13. The plate 19 is provided with bearing members 20, 21 and 22. The bearing members 20 and 21 are spaced slightly apart and mounted near the lower end of the frame 19, and are designed to rotatively receive the hub members 23 of a belt sheave 24. The center of the sheave 24 is provided with a central opening 25 designed to receive a vertically extending shaft 26 which extends through the bearing member 22 and has its upper end provided with a circular cutter knife 27.

The shaft 26 is slidably and rotatively mounted in its bearings. The device is so located that when the knife 27 is near its top position of movement, one edge of it will engage the chunk of meat 14 and enter it to a depth substantially equal to the thickness of a slice of meat, and near the inner face of the rine.

The sheave 24 is provided with inwardly extending pins 28 which extend into the keyways 29 of the shaft 26. Each of the pins is provided with a roller 30 so that an anti-friction bearing is formed for imparting a rotary movement to the shaft 26 from the wheel 24 and to permit the shaft to move freely through the said sheave.

Figure 2:
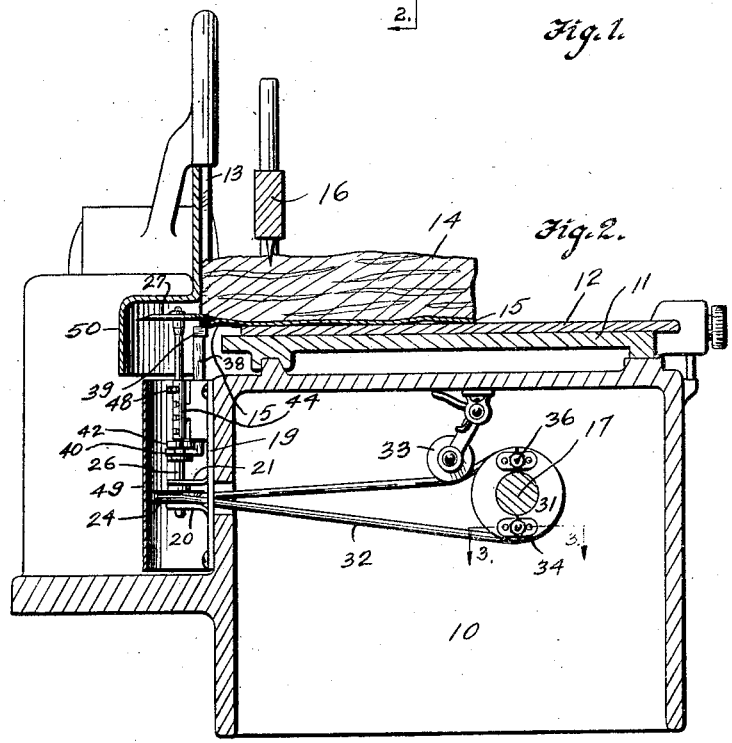
Figure 2 is an enlarged detail sectional view taken on the line 2—2 of Figure 1.
Figure 3:
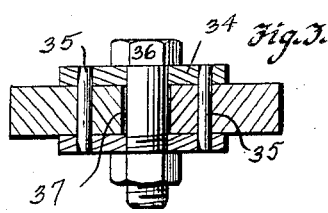
Figure 3 is an enlarged detail sectional view taken on the line 3—3 of Figure 2.
Figure 4:
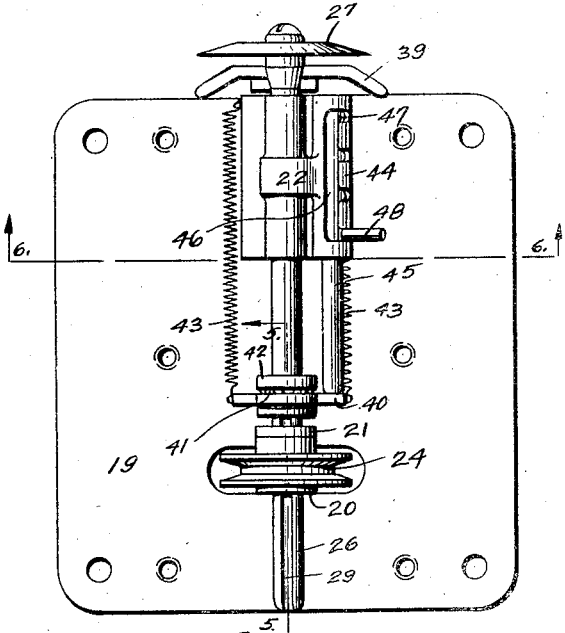
Figure 4 is a front elevation of my improved attachment.

The shaft 17 is provided with a detachable sheave 31 designed to receive a belt 32 extending over the sheave 24, as clearly shown in Figure 2. A spring actuated belt tightener 33 is provided. The sheave 31 is formed in halves, the halves being connected together by means of straps 34. The straps 34 are secured in position by means of tapered pins 35. A bolt 36 is passed through both of the straps 34 and through an opening 37 provided between the two edges of the members 33. The tapered pins serve to hold the two halves tight against the shaft 17, while the bolts 36 serve to hold the straps 34 in position. Any other means for locking the sheave 31 to the shaft, however, might be provided.

The bearing 22 is provided with a slidably mounted bar 38, preferably square in cross section, and has its upper end provided with a guide plate 39 which rests beneath the knife 27 a distance equal to the thickness of the desired rine. The guide plate 39 is designed to rest beneath the overhanging portion of the rine 15 and which is that portion of the rine which is being removed by the slicing knife.

Figure 5:
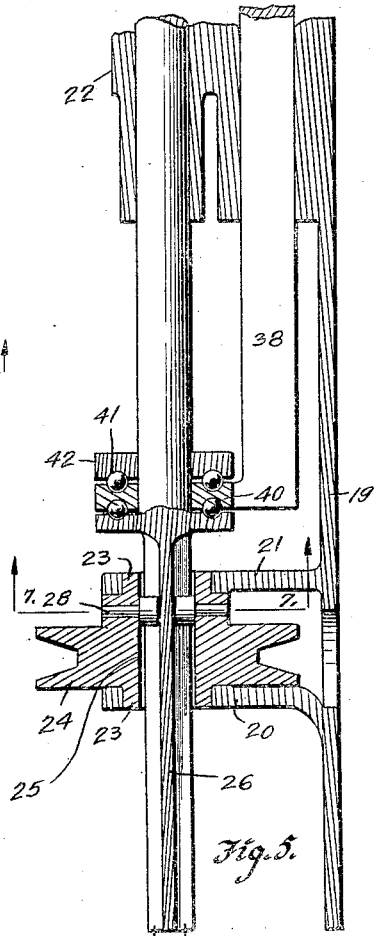
Figure 5 is a longitudinal central sectional view taken on the line 5—5 of Figure 4.
Figure 6:
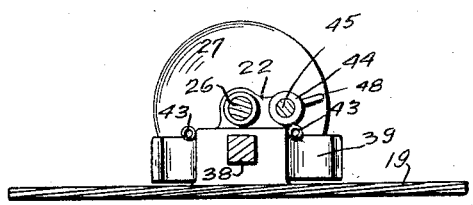
Figure 6 is a detail view taken on the line 6—6 of Figure 4.
Figure 7:
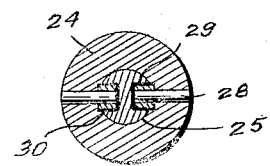
Figure 7 is a detail sectional view taken on the line 7—7 of Figure 5.

For yieldably holding the plate 39 to the under surface of the rine, I have provided a yoke 40 which extends over the shaft 26 and is provided with ball thrust bearings 41 on its upper surface, the said bearings being designed to engage the under surface of a collar 42 rigidly secured to the shaft 26. Each end of the yoke member 40 is attached to one end of a spring 43 which extends longitudinally to opposite sides of the bearing member 22, and have their upper ends connected to the upper end of said bearing member. The yoke 40 is also connected to the lower end of the bar 38, as clearly shown in Figures 2 and 5. This provides means whereby the plate 29 will be yieldably supported beneath the under surface of the rine, so that the plate may follow any irregularity in the said rine and cause the cutter 27 to travel therewith, producing a rine of uniform thickness, regardless of whether the rine is straight or not.

The bearing 22 is also provided with a sleeve 44 adjacent to one side of the shaft 26. The said sleeve is designed to carry a rotatively and slidably mounted bolt 45, the lower end of which is designed to engage one end of the yoke 40. The sleeve 44 is provided with a longitudinal slot 46, one edge of which is provided with a series of notches 47. The bolt 45 is provided with an outwardly extending pin 48 designed to travel in the slot 46, but is capable of being moved to position in any one of the notches 47 by rotating the bolt 45. The pin 48 is of sufficient length that it may be used as a handle.

By this arrangement it will be seen that the cutter blade together with the plate 39 may be locked down to a lowered position of movement where the cutter 37 will be beneath either of the carriages 11 or 12, and out of the way in case it is desired to use it in cutting other kinds of meat. Guards 49 and 50 are provided to prevent accidental engagement with the cutter 27 and the operating mechanism.

By mounting the hubs of the pulley sheave 24 in the bearings 20 I have provided means whereby the tension applied to the pulley by the pull of the belt 32, is relieved from the shaft 26, permitting said shaft to move freely through the said sheave. The rollers 30 provide means whereby the shaft may be moved up and down at the time power is being applied to the said shaft with a minimum amount of friction between the said parts. The collar 42 and the roller bearings 41 also provide anti-friction bearing members for the same purpose.

By this arrangement it will be seen that I have provided an improved rining mechanism of simple, durable and inexpensive construction which may be applied to a slicing machine at a minimum cost, and when applied will efficiently and quickly remove the rine. The shaft 17 is rotated to cause the shaft 26 to rotate and with it the knife 27, which takes place at the time the carriage 11 is moving across the frame 10. In fact, the cutter 27 rotates continuously.

I am well aware that cutters have been provided for removing rines from meat while it is being sliced, but none of these cutters are provided with means whereby the rine may be made of uniform thickness. In fact, the other devices, as far as I am aware, are impractical, due to the fact that the rine is never straight and no means is provided whereby the knife may be automatically elevated and lowered to accommodate the contour of the rine, which results in the rine being cut very thin at certain portions and sometimes the cutter runs beneath the rine altogether, failing to remove a portion of the rine, and in other places the rine might be several times as thick as it should be, which results in a waste of meat.

I claim as my invention:

1. A meat riner comprising a support, a shaft rotatively and slidably mounted in said support, a cutter on said shaft a bar slidably mounted in said support in parallel relation with said shaft, a guide plate on one end of said bar spaced a slight distance from one face of said cutter plate, means for rotating said shaft, and means for yieldably moving said bar and said rotary shaft longitudinally in one direction.

2. A meat riner comprising a support, a shaft rotatively and slidably mounted in said support, a cutter on said shaft a bar slidably mounted in said support in parallel relation with said shaft, a guide plate on one end of said bar spaced a slight distance from one face of said cutter plate, means for rotating said shaft, means for yieldably moving said bar and said rotary shaft longitudinally in one direction, and means for stopping the longitudinal movement of said shaft and said bar at predetermined positions.

3. A meat riner comprising a support, a rotary knife, means for imparting rotary movement to said knife, means for imparting yieldable axial movement to said knife, and a guide plate for controlling said axial movement.

4. In combination, a meat slicer having a slicing knife and a movable meat carrying carriage, a rine remover comprising a support, a shaft rotatively and slidably mounted, a cutter blade on the upper end of said shaft designed to engage one edge of the meat near the inner face of the rine, a guide plate beneath the rine, means for rotating said cutter, means for yieldably holding said guide plate to the under surface of the rine, and means for imparting longitudinal movement to said shaft from said guide plate.

5. In combination, a meat slicer having a slicing knife and a movable meat carrying carriage designed to support a piece of meat to be sliced having on its under surface a rine, one edge of said meat being supported beyond the edge of said carriage, a rine removing knife designed to engage one edge of the meat near the inner face of the rine, means for supporting said knife to move inwardly from the outer surface of said rine, and a guide plate for limiting the said inward movement by engaging the under surface of the extending portion of said rine.

6. In combination, a meat slicer having a slicing knife and a movable meat carrying carriage designed to support a piece of meat to be sliced having on its under surface a rine, one edge of said meat being supported beyond the edge of said carriage, a rine removing knife designed to engage one edge of the meat near the inner face of the rine, means for supporting said knife to move inwardly from the outer surface of said rine, and means for causing said rine removing knife to follow the contour of the outer surface of the rine in fixed predetermined distance from the outer surface of the rine to cut a rine of uniform thickness throughout its entire length.

7. In a device of the class described, means for movably supporting a piece of meat to be sliced having on one of its surfaces a rine, a cutter for removing the rine from the meat as it is being moved, said cutter resting in a plane parallel with the common plane of said rine and capable of movement transversely with the movement of said meat, and means adapted to move in unison with the transverse movement of said cutter to engage the outer surface of said rine and for gauging the depth of said cut.

JOHN W. NEASHAM.